United States Patent
Huang et al.

(10) Patent No.: US 9,324,282 B2
(45) Date of Patent: Apr. 26, 2016

(54) LIQUID CRYSTAL PIXEL CIRCUIT AND DRIVING METHOD THEREOF

(71) Applicant: AU OPTRONICS CORP., Hsin-Chu (TW)

(72) Inventors: Kuo-Hsuan Huang, Hsin-Chu (TW); Chen-Yi Wu, Hsin-Chu (TW); Bo-Ru Jian, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/509,328

(22) Filed: Oct. 8, 2014

(65) Prior Publication Data

US 2016/0018688 A1    Jan. 21, 2016

(30) Foreign Application Priority Data

Jul. 17, 2014  (TW) .............................. 103124591 A

(51) Int. Cl.
  *G09G 3/36*    (2006.01)
  *G02F 1/1343*  (2006.01)
  *G02F 1/1362*  (2006.01)

(52) U.S. Cl.
  CPC .............. *G09G 3/36* (2013.01); *G02F 1/13624* (2013.01); *G02F 1/134309* (2013.01); *G02F 2001/134345* (2013.01); *G09G 3/3648* (2013.01)

(58) Field of Classification Search
  CPC . G09G 3/3611; G09G 3/2074; G09G 3/3659; G09G 3/3696; G09G 3/3648
  USPC .............................................. 345/87, 204, 76
  See application file for complete search history.

(56) References Cited

U.S. PATENT DOCUMENTS

| | | | |
|---|---|---|---|
| 7,944,424 B2 | 5/2011 | Tsao et al. | |
| 8,330,889 B2 | 12/2012 | Um et al. | |
| 8,854,561 B2 * | 10/2014 | Liao | G02F 1/136213 345/93 |
| 9,030,504 B2 * | 5/2015 | Chen | G09G 3/3648 345/690 |
| 9,224,354 B2 * | 12/2015 | Chen | G09G 3/3696 |
| 2009/0146936 A1 | 6/2009 | Ueda et al. | |
| 2009/0268113 A1 | 10/2009 | Chang et al. | |
| 2011/0115998 A1 | 5/2011 | Liao et al. | |
| 2012/0153996 A1 * | 6/2012 | Su | G09G 3/3659 327/109 |
| 2013/0044143 A1 * | 2/2013 | Hou | H04N 13/0434 345/690 |
| 2013/0100106 A1 * | 4/2013 | Wu | G09G 3/0274 345/212 |
| 2013/0128166 A1 * | 5/2013 | Chiang | G02F 1/1362 349/38 |

(Continued)

FOREIGN PATENT DOCUMENTS

| | | |
|---|---|---|
| CN | 201072484 Y | 6/2008 |
| CN | 102591083 A | 7/2012 |

(Continued)

OTHER PUBLICATIONS

Taiwan Patent Office, "Office Action," Sep. 23, 2015.
China Patent Office, "Office Action" issued on Dec. 28, 2015, China.

*Primary Examiner* — Grant Sitta
(74) *Attorney, Agent, or Firm* — WPAT, PC; Justin King

(57) ABSTRACT

A liquid crystal pixel circuit and a driving method thereof are provided. The liquid crystal pixel circuit has a main pixel, a sub pixel and a charge sharing switch. The charge sharing switch is electrically coupled between the main pixel and the sub pixel. The main pixel, the sub pixel and the charge sharing switch are controlled by the same gate line. The provided driving method is used for driving the liquid-crystal pixel circuit mentioned above.

6 Claims, 4 Drawing Sheets

(56) References Cited

U.S. PATENT DOCUMENTS

2015/0015821 A1  1/2015  Lo et al.
2015/0022507 A1*  1/2015  Yao ........................ G09G 3/003
                                                    345/206

FOREIGN PATENT DOCUMENTS

| JP | H09-073064 | 3/1997 |
| TW | 200944907 | 11/2009 |
| TW | 201116911 | 5/2011 |

* cited by examiner

LIQUID CRYSTAL PIXEL CIRCUIT AND DRIVING METHOD THEREOF

TECHNICAL FIELD

The present disclosure relates to a liquid crystal pixel circuit and a driving method thereof, and more particularly to a liquid crystal pixel circuit having the charge sharing between the main pixel and sub pixel therein and a driving method thereof.

BACKGROUND

Generally, the color shift in a liquid crystal display can be solved by the charge sharing performed among a plurality of capacitors in a pixel. Please refer to FIG. 1, which is a schematic circuit view of a conventional liquid crystal pixel circuit for solving the color shift problem. As shown, in the conventional liquid crystal pixel circuit, the main pixel is controlled by the gate line Gate1 and is configured to, through the transistor T1, receive data from the data line Data and then store the received data in the storage capacitor $C_{st1}$; and the sub pixel is controlled by the gate line Gate1 and is configured to, through the transistor T2, receive data from the data line Data and then store the received data in the storage capacitor $C_{st2}$. In addition, the sub pixel is also controlled by the gate line Gate2 and is configured to, through the transistor T3, make the storage capacitor $C_{st2}$ and the storage capacitor $C_{csb}$ have the charge sharing. Through the aforementioned circuit structure, the liquid crystal pixel circuit of FIG. 1 can appropriately control the ratio of the voltage stored in the storage capacitor $C_{st1}$ to the voltage stored in the storage capacitor $C_{st2}$; thus, the liquid crystal capacitors $C_{lc1}$ and $C_{lc2}$ can be driven by predetermined voltages thereby eliminating the color shift when image is being displayed.

However, with the technology development, the current liquid crystal display has rapidly-increasing resolution and image update frequency. Accordingly, more data stored in the pixel circuits is needed to be updated in the same time period in response to the increasing resolution; a shorter time is needed for updating the data stored in the pixel circuits in response to the increasing image update frequency; or a shorter time is needed for updating the data stored in the pixel circuits in response to both of the increasing resolution and the increasing image update frequency. Thus, for each one of the pixel circuits, the charging time for storing the data transmitted on the data line Data to the storage capacitors $C_{st21}$ and $C_{st2}$ is getting shorter.

Because the charging time can be used by the pixel circuit is reduced, the storage capacitors $C_{st21}$ and $C_{st2}$ may not be fully charged and which may consequently lead to that the voltages stored in the storage capacitors $C_{st21}$ and $C_{st2}$ may not have the same voltage level. Once the storage capacitors $C_{st21}$ and $C_{st2}$ have different stored voltages, the ratio of the voltage stored in the storage capacitor $C_{st2}$ to the voltage stored in the storage capacitor $C_{st1}$ may not reach to the expected value after the charge sharing; and consequentially, the color shift may occur again during the image displaying process.

SUMMARY

Therefore, an aspect of the present disclosure is to provide a liquid crystal pixel circuit and a driving method thereof capable of eliminating the color shift more efficiently, compared with the prior art, at an environment having higher pixel data update frequency.

The present disclosure provides a liquid crystal pixel circuit, which includes a first gate line, a first data line, a main pixel, a sub pixel and a charge sharing switch. The first gate line is configured to transmit a first gate control signal. The first data line is configured to transmit a data signal. The main pixel is electrically coupled to the first gate line and the first data line. The main pixel includes a first switching element and a first storage element. The first switching element includes a first channel terminal, a second channel terminal and a control terminal. The first switching element is configured to have its control terminal electrically coupled to the first gate line and its first channel terminal electrically coupled to the first data line. The first storage element is electrically coupled to the second channel terminal of the first switching element. The sub pixel is electrically coupled to the first gate line and the first data line. The sub pixel includes a second switching element and a second storage element. The second switching element includes a first channel terminal, a second channel terminal and a control terminal. The second switching element is configured to have its control terminal electrically coupled to the first gate line and its first channel terminal electrically coupled to the first data line. The second storage element is electrically coupled to the second channel terminal of the second switching element. The charge sharing switch includes a first channel terminal, a second channel terminal and a control terminal. The charge sharing switch is configured to have its control terminal electrically coupled to the first gate line; its first channel terminal electrically coupled to the second channel terminal of the first switching element; and its second channel terminal electrically coupled to the second channel terminal of the second switching element.

The present disclosure further provides a driving method for a liquid crystal pixel circuit. The driving method includes steps of: configuring, while a data line is directly providing a data signal to a main pixel, the data line to directly provide the data signal to a sub pixel, wherein the main pixel and the sub pixel belong to a same pixel circuit; turning on, in a whole period while the data signal is being provided to the main pixel and the sub pixel, an electrical channel between the main pixel and the sub pixel thereby making charges able to flow between the main pixel and the sub pixel; and turning off, in a whole period while the data signal is not being provided to the main pixel and the sub pixel, the electrical channel between the main pixel and the sub pixel.

In summary, through configuring the main pixel circuit, the sub pixel and the charge sharing switch to be controlled by the same gate line, the main pixel and the sub pixel can have charge sharing with each other while being configured to receive data signal and consequentially the voltages stored in the main pixel and the sub pixel can be getting closer. Thus, the impact caused by the main pixel and the sub pixel having different voltages in the conventional technology is reduced. In addition, even the ratio of the voltage stored in the main pixel and the voltage stored in the sub pixel is required to be further adjusted, the obtained result is more stable, compared with the prior art. Therefore, at an environment having a higher pixel data update frequency, the liquid crystal pixel circuit of the present disclosure can eliminate the color shift more efficiently, compared with the prior art.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
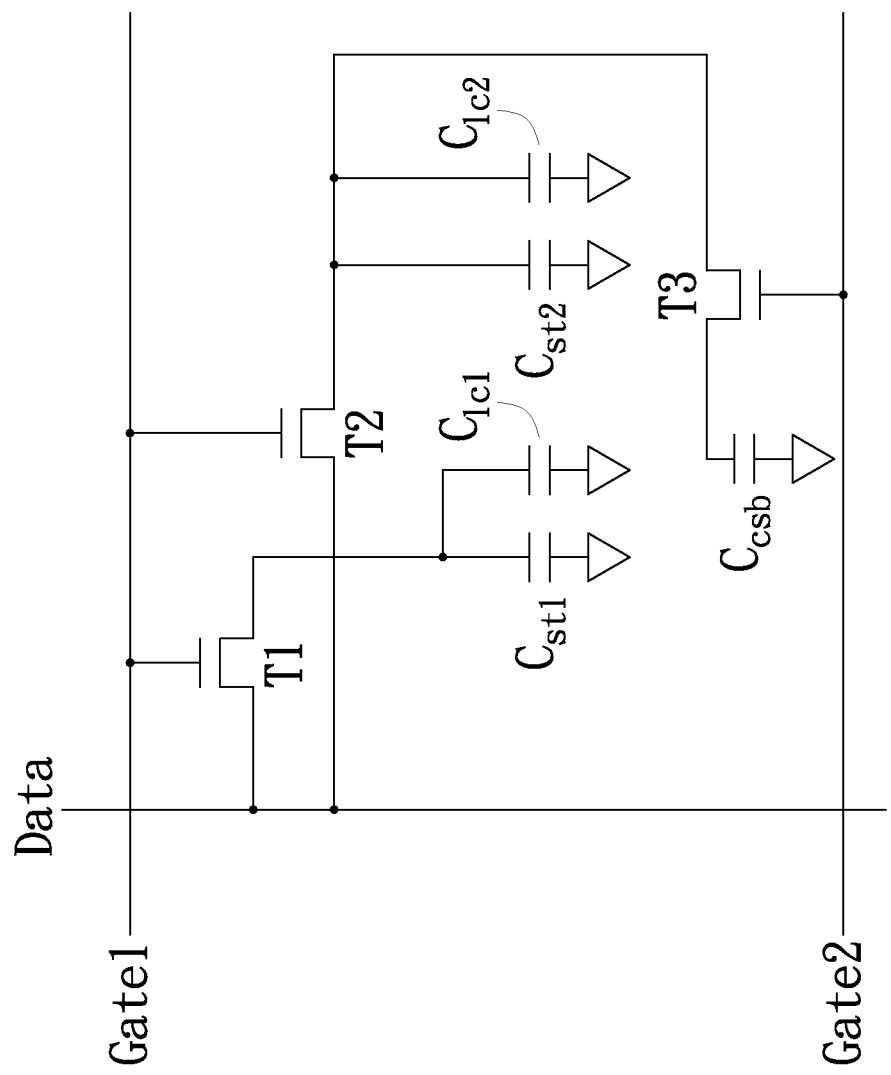
FIG. 1 is a schematic circuit view of a conventional liquid crystal pixel circuit for solving the color shift problem.
Figure 2:
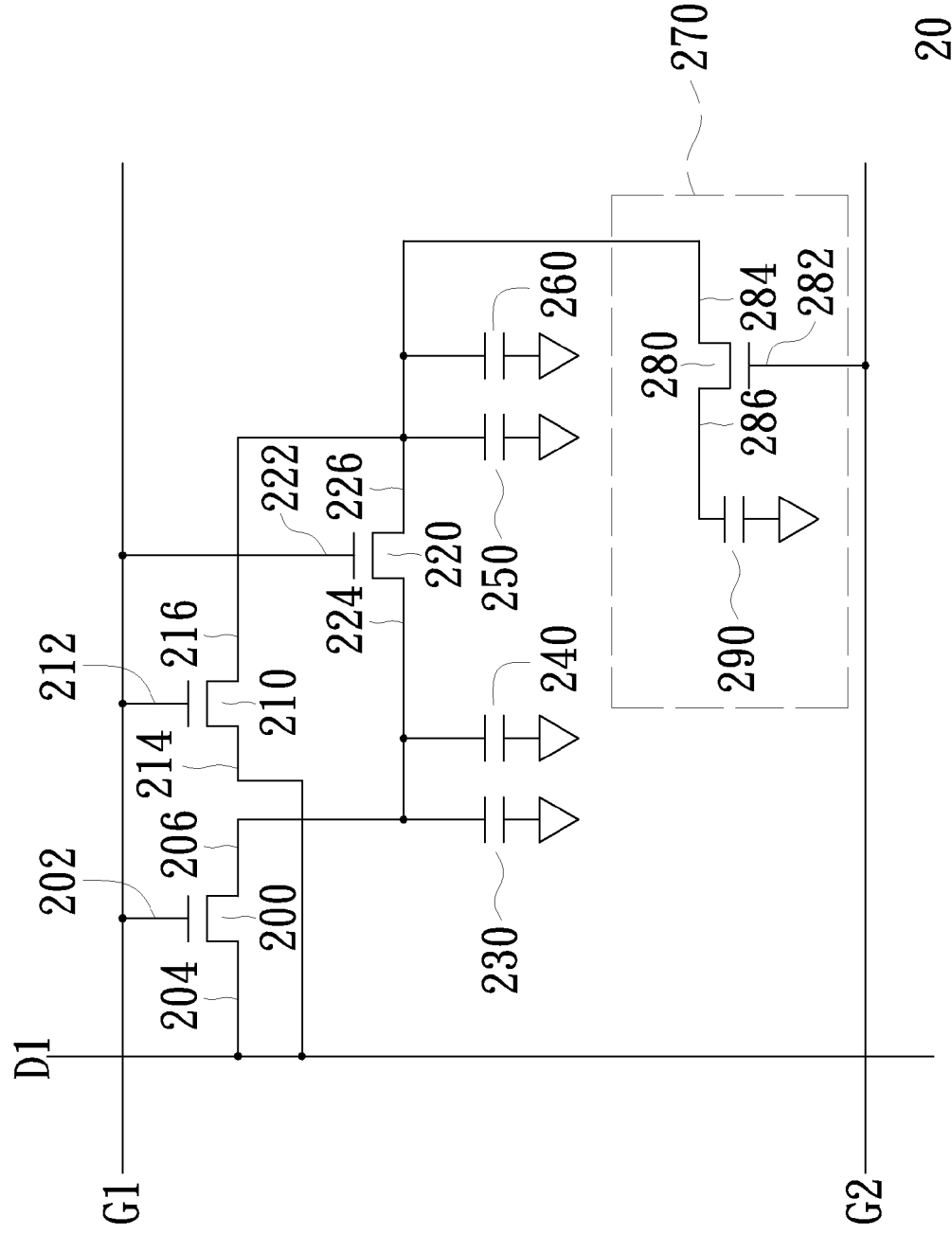
FIG. 2 is a schematic circuit view of a liquid crystal pixel circuit in accordance with an embodiment of the present disclosure.

FIG. 2 is a schematic circuit view of a liquid crystal pixel circuit in accordance with an embodiment of the present disclosure. As shown, the liquid crystal pixel circuit 20 in the present embodiment includes N-type transistors 200, 210 and 220 and storage capacitors 230 and 250. In addition, two liquid crystal capacitors 240 and 260, formed by the architecture of the related liquid crystal display panel and the liquid crystals in the liquid crystal display panel, are provided. The storage capacitors 230 and 250 are configured to have the voltages stored therein for voltage biasing the liquid crystal capacitors 240 and 260, respectively, thereby making the liquid crystals in the liquid crystal capacitors 240 and 260 have deflections so as to change the light transmittances.

In the present embodiment, the liquid crystal pixel circuit 20 may be divided into a main pixel, which includes the N-type transistor 200 and the storage capacitor 230, and a sub pixel, which includes the N-type transistor 210 and the storage capacitor 250. In the main pixel, the N-type transistor 200 has a control terminal 202 and channel terminals 204 and 206. The N-type transistor 200 is configured to have the control terminal 202 electrically coupled to a gate line G1 and for receiving a gate control signal transmitted on the gate line G1; and the channel terminal 204 electrically coupled to a data line D1 and for receiving a data signal transmitted on the data line D1. Specifically, the N-type transistor 200 is configured to turn on or turn off the electrical channel between the channel terminals 204 and 206 according to the voltage at the control terminal 202. When the electrical channel between the channel terminals 204 and 206 is turned on, the data signal received by the channel terminal 204 is transmitted to the storage capacitor 230 which is electrically coupled to the channel terminal 206. Thus, the voltage stored in the storage capacitor 230 can be used to bias the voltages at the two terminals of the corresponding liquid crystal capacitor 240 thereby changing the light transmittances of the liquid crystals in the liquid crystal capacitor 240.

In the sub pixel, the N-type transistor 210 has a control terminal 212 and channel terminals 214 and 216. The N-type transistor 210 is configured to have the control terminal 212 electrically coupled to the gate line G1 and for receiving the gate control signal transmitted on the gate line G1; and the channel terminal 214 electrically coupled to the data line D1 and for receiving the data signal transmitted on the data line D1. Specifically, the N-type transistor 210 is configured to turn on or turn off the electrical channel between the channel terminals 214 and 216 according to the voltage at the control terminal 212. When the electrical channel between the channel terminals 214 and 216 is turned on, the data signal received by the channel terminal 214 is transmitted to the storage capacitor 250 which is electrically coupled to the channel terminal 216. Thus, the voltage stored in the storage capacitor 250 can be used to bias the voltages at the two terminals of the corresponding liquid crystal capacitor 260 thereby changing the light transmittances of the liquid crystals in the liquid crystal capacitor 260.

Furthermore, the N-type transistor 220, electrically coupled between the main pixel and the sub pixel, has a control terminal 222 and channel terminals 224 and 226. The N-type transistor 220 has a control terminal 222 and channel terminals 224 and 226. The N-type transistor 220 is configured to have the control terminal 222 electrically coupled to the gate line G1 and for receiving the gate control signal transmitted on the gate line G1. Specifically, the N-type transistor 220 is configured to turn on or turn off the electrical channel between the channel terminals 224 and 226 according to the voltage at the control terminal 222. As shown, the channel terminal 224 of the N-type transistor 220 is electrically coupled to the channel terminal 206 of the N-type transistor 200 and the channel terminal 226 of the N-type transistor 220 is electrically coupled to the channel terminal 216 of the N-type transistor 210; thus, through the charge sharing, the storage capacitors 230 and 250 can have the same storage voltage when the electrical channel between the channel terminals 224 and 226 of the N-type transistor 220 is turned on.

In addition, based upon the situation that the storage capacitor 230 in the main pixel and the storage capacitor 250 in the sub pixel have the same storage voltage, the color shift can be further eliminated in the present embodiment through further employing a sub-pixel charge sharing unit 270, which is configured to adjust the final voltage of the storage capacitor 250.

As shown in FIG. 2, the sub-pixel charge sharing unit 270 in the present embodiment includes an N-type transistor 280 and a storage capacitor 290. The N-type transistor 280 has a control terminal 282 and channel terminals 284 and 286. The N-type transistor 280 is configured to have the control terminal 282 electrically coupled to a gate line G2 and for receiving a gate control signal transmitted on the gate line G2. Specifically, the N-type transistor 280 is configured to turn on or turn off the electrical channel between the channel terminals 284 and 286 according to the voltage at the control terminal 282. As shown, the channel terminal 284 of the N-type transistor 280 is electrically coupled to the storage capacitor 250, the channel terminal 216 of the N-type transistor 210 and the channel terminal 226 of the N-type transistor 220 and the channel terminal 286 of the N-type transistor 280 is electrically coupled to the storage capacitor 290; thus, through the charge sharing, the storage capacitors 250 and 290 can have the same storage voltage when the electrical channel between the channel terminals 284 and 286 of the N-type transistor 280 is turned on.

Figure 3:
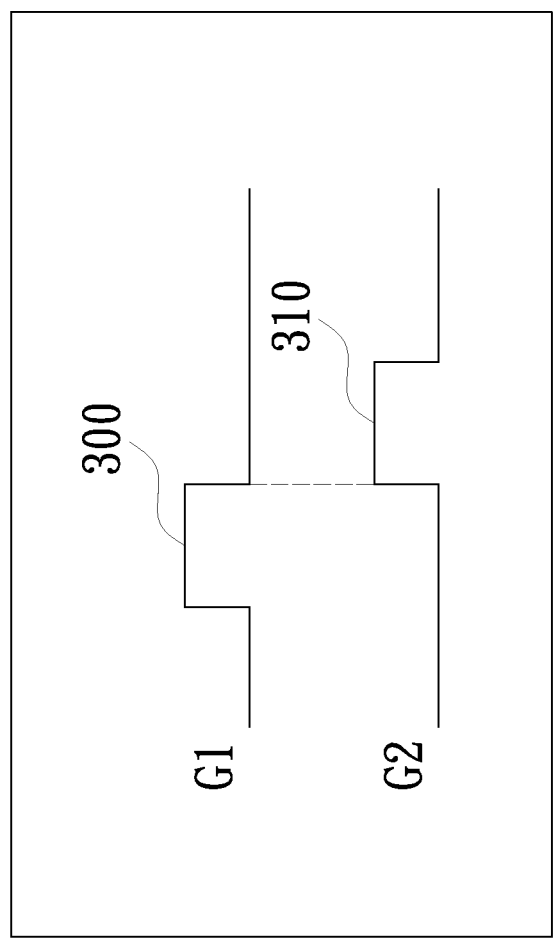
FIG. 3 is a timing diagram of related signals for driving a liquid crystal pixel circuit in accordance with an embodiment of the present disclosure.

FIG. 3 is a timing diagram of related signals for driving a liquid crystal pixel circuit in accordance with an embodiment of the present disclosure. As shown, the gate control signals transmitted on the gate line G1 has an enable period 300, and the gate control signal transmitted on the gate line G2 has an enable period 310. Please refer to both of FIGS. 2 and 3. In order to make the liquid crystal pixel circuit 20 (including the pixel charge sharing unit 270) capable of being operated normally, the two periods 300 and 310 are configured to have no overlapping interval in one embodiment. However, in an extreme case, the two periods 300 and 310 may be allowed to have an extremely-short overlapping interval; but, it is to be noted that the N-type transistor 200 (or the N-type transistors 210, 220) and the N-type transistor 280 should be prevented from being turned on at the same time in the overlapping interval. In other words, even the circuit impedance causes the gate control signals respectively transmitted on the gate lines G1 and G2 to have waveform change thereby leading to an overlapping interval between the periods 300 and 310, it should try not to turn on the N-type transistor 200 (or the N-type transistors 210, 220) and the N-type transistor 280 at the same time, so as to avoid specific problems when images are being displayed.

Please refer to FIGS. 2 and 3, again. When the gate control signal transmitted on the gate line G1 is in the enable period 300, both of the N-type transistors 200 and 210 are turned on and consequentially the data signal transmitted on the data line D1 is also provided to the sub pixel as well as being provided to the main pixel. Additionally, the N-type transistor 220 is also turned on in the whole enable period 300; thus, in a specific interval while the data signal transmitted on the data line D1 is supplied to both of the main pixel and the sub pixel, the electrical channel between the main pixel and the sub pixel is turned on and accordingly charge flowing is occurred between the main pixel and the sub pixel in the enable period 300. In the period except the enable period 300, all of the N-type transistors 200, 210 and 220 are turned off; thus, the data signal transmitted on the data line D1 will not be provided to the sub pixel and the main pixel and accordingly the electrical channel between the main pixel and the sub pixel is turned off.

After the enable period 300, the gate control signal transmitted on the gate line G2 is in the enable period 310. In the enable period 310, the N-type transistors 200, 210 and 220 are turned off but the N-type transistor 280 is turned on. Thus, in the enable period 310, the storage capacitor 250 and the storage capacitor 290 can have charge sharing, which may lead to a voltage change in the sub pixel; however, it is to be noted that the voltage stored in the main pixel is not affected by the charge sharing and has no change in this period.

Figure 4:
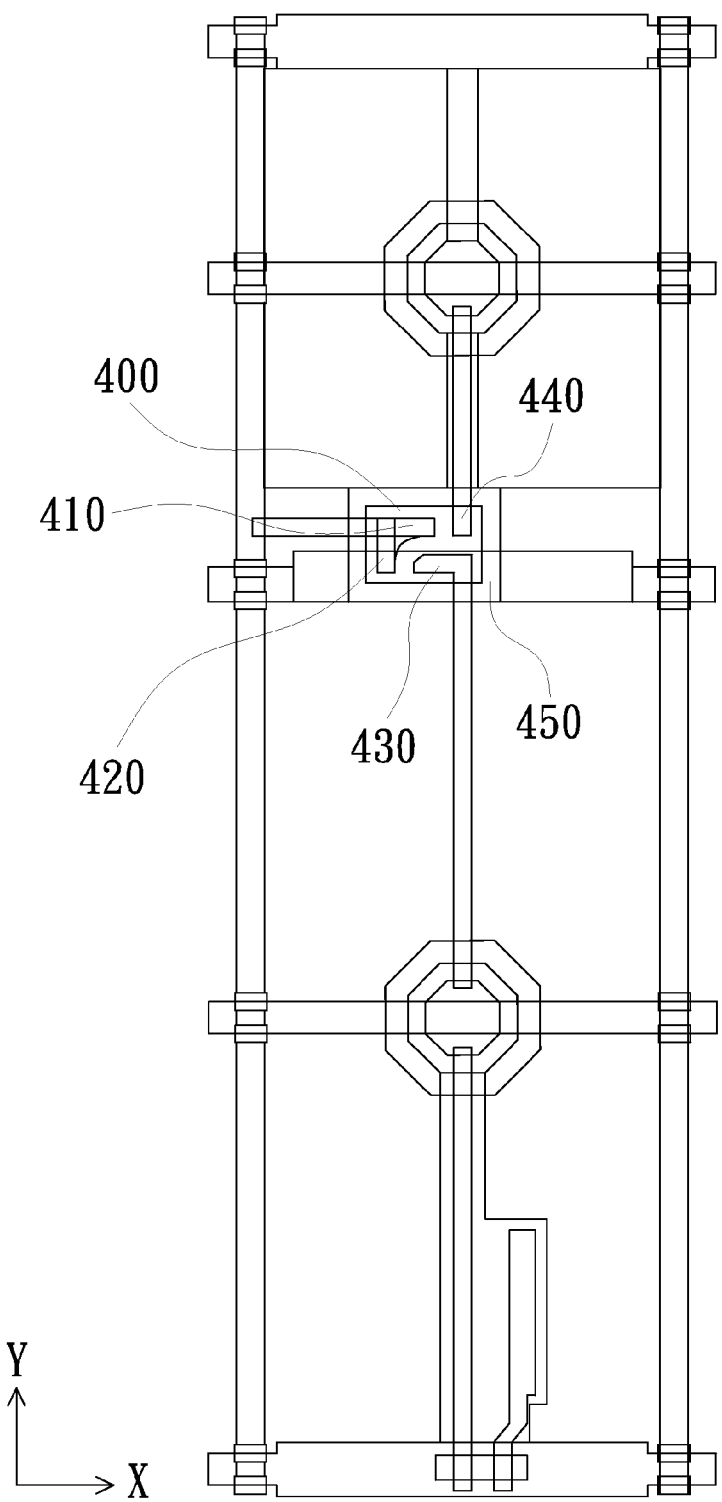
FIG. 4, which is a schematic view illustrating a circuit layout of a liquid crystal pixel circuit in accordance with an embodiment of the present disclosure.

Next, please refer to FIG. 4, which is a schematic view illustrating a circuit layout of a liquid crystal pixel circuit in accordance with an embodiment of the present disclosure. As shown, conductors 400, 410, 420, 430 and 440 and a semiconductor layer 450 are used for the formations of the N-type transistors 200, 210 and 220 shown in FIG. 2. Specifically, the conductors 400, 410 and 440 are used to form the control terminal 202, the channel terminal 204 and the channel terminal 206 of the N-type transistor 200, respectively; the conductors 400, 420 and 430 are used to form the control terminal 212, the channel terminal 214 and the channel terminal 216 of the N-type transistor 210, respectively; the conductors 400, 440 and 450 are used to form the control terminal 222, the channel terminal 224 and the channel terminal 226 of the N-type transistor 220, respectively. In addition, as shown in FIG. 4, the conductor 440 extends in a Y-axis direction; and the conductor 430 is limited to extend in the Y-axis direction and an X-axis direction, wherein the Y-axis direction and the X-axis direction are perpendicular to each other.

According to related experimental results, it is indicated that the liquid crystal pixel circuit provided in each embodiment of the present disclosure has improved displaying effect. For example, after the end of the charging period (for example, the enable period 300 in FIG. 3) of the main pixel and the sub pixel, the differential value between the voltages stored in the main pixel and the sub pixel is greatly reduced. Herein a data signal having a maximum voltage of 15V is taken as an example. In prior art, the differential value between the voltages stored in the charged main pixel and the charged sub pixel is about 1.426 V. However, through employing the liquid crystal pixel circuit of the present disclosure, the differential value between the voltages stored in the charged main pixel and the charged sub pixel is reduced to about 0.528 V. Thus, it can be seen that the uneven charging issue occurring in the main pixel and the sub pixel can be improved by the technology provided by the present disclosure. In addition, through adopting the circuit layout illustrated in FIG. 4, each pixel can be added with some transparent regions so that the displaying quality can be further improved.

Furthermore, the N-type transistors 200, 210, 220 and 280 mentioned in the aforementioned embodiments of the present disclosure are functioned as switches for the turn on or turn off of an electrical channel. Thus, to those ordinarily skilled in the art, it is understood that the N-type transistors 200, 210, 220 and 280 can be replaced by other types of switches, such as P-type transistors or micro electro mechanical witches (MEMS). In other words, the implementation of the liquid crystal pixel circuit of the present disclosure is not limited to the N-type transistors 200, 210, 220 and 280. In response to the requirement of actual circuit design and manufacture, all or some of the N-type transistors 200, 210, 220 and 280 can be replaced by other types of switches capable of achieving the same functional effect. Similarly, all or some of the storage capacitors 230, 250 and 290 may also be replaced by other suitable storage elements.

In summary, through configuring the main pixel circuit, the sub pixel and the charge sharing switch to be controlled by the same gate line, the main pixel and the sub pixel can have charge sharing with each other while being configured to receive data signal and consequentially the voltages stored in the main pixel and the sub pixel can be getting closer. Thus, the impact caused by the main pixel and the sub pixel having different voltages in the conventional technology is reduced. In addition, even the ratio of the voltage stored in the main pixel and the voltage stored in the sub pixel is required to be further adjusted, the obtained result is more stable, compared with the prior art. Therefore, at an environment having a higher pixel data update frequency, the liquid crystal pixel circuit of the present disclosure can eliminate the color shift more efficiently, compared with the prior art.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal pixel circuit, comprising:
 a first gate line, configured to transmit a first gate control signal;
 a first data line, configured to transmit a data signal;
 a main pixel, comprising:
  a first switching element, comprising:
   a first channel terminal, electrically coupled to the first data line;
   a second channel terminal; and
   a control terminal, electrically coupled to the first gate line; and
  a first storage element, directly coupled to the second channel terminal of the first switching element;

a sub pixel, comprising:
- a second switching element, comprising:
  - a first channel terminal, electrically coupled to the first data line;
  - a second channel terminal; and
  - a control terminal; and
- a second storage element, directly coupled to the second channel terminal of the second switching element; and a charge sharing switch, comprising:
- a first channel terminal, directly coupled to the second channel terminal of the first switching element;
- a second channel terminal, directly coupled to the second channel terminal of the second switching element; and
- a control terminal, electrically coupled to the first gate line, wherein the first storage element and the second storage element have the same storage voltage when the charge sharing switch is turned on.

2. The liquid crystal pixel circuit according to claim 1, further comprising:
- a second gate line, configured to transmit a second gate control signal; and
- a sub pixel charge sharing unit, electrically coupled to the second gate line and the second channel terminal of the second switching element, the sub pixel charge sharing unit comprising:
  - a third switching element, comprising a first channel terminal, a second channel terminal and a control terminal, the third switching element being configured to have its control terminal electrically coupled to the second gate line and its first channel terminal electrically coupled to the second channel terminal of the second switching element; and
  - a third storage element, electrically coupled to the second channel terminal of the third switching element.

3. The liquid crystal pixel circuit according to claim 2, wherein the first gate control signal and the second gate control signal are enabled at a different time.

4. The liquid crystal pixel circuit according to claim 1, wherein the charge sharing switch comprises a transistor.

5. The liquid crystal pixel circuit according to claim 1, wherein an extending direction of a conductor, for forming the first and second channel terminals of the charge sharing switch, is limited to a first direction and a second direction, wherein the first direction is perpendicular to the second direction.

6. A driving method for a liquid crystal pixel circuit, the liquid crystal pixel circuit comprising a main pixel, a sub pixel and a charge sharing switch, the main pixel comprising a first switching element, the sub pixel comprising a second switching element, and the first channel terminal of the charge sharing switch directly electrically coupled to the first switching element and the second channel terminal of the charge sharing switch directly electrically coupled to the second switching element, the driving method comprising:
- configuring, while a data line is directly providing a data signal to the main pixel, the data line to directly provide the data signal to the sub pixel, wherein the main pixel and the sub pixel belong to a same pixel circuit;
- turning on, in a whole period while the data signal is being provided to the main pixel and the sub pixel, an electrical channel generated through the charge sharing switch and between the first switching element of the main pixel and the second switching element of the sub pixel thereby making charges able to flow between the main pixel and the sub pixel; and
- turning off, in a whole period while the data signal is not being provided to the first switching element of the main pixel and the second switching element of the sub pixel, the electrical channel between the main pixel and the sub pixel.

* * * * *